Aug. 14, 1951  L. FLETCHER ET AL  2,564,058
INSECTICIDE DUSTER
Filed April 30, 1945
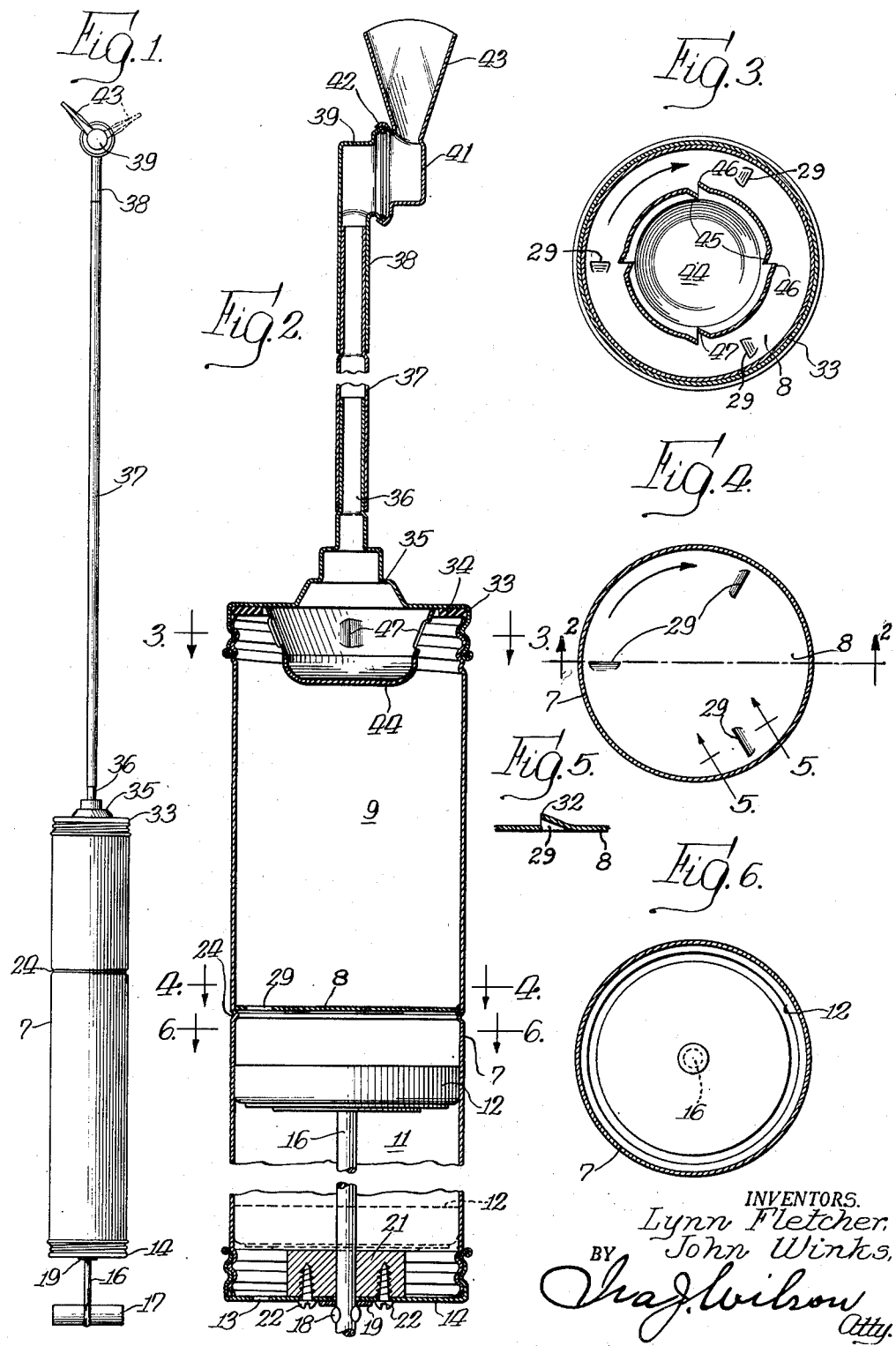
INVENTORS.
Lynn Fletcher,
John Winks,
BY Ira J. Wilson
Atty.

Patented Aug. 14, 1951

2,564,058

UNITED STATES PATENT OFFICE 2,564,058

INSECTICIDE DUSTER

Lynn Fletcher and John Winks, Lowell, Mich., assignors to Lowell Specialty Company, Lowell, Mich., a corporation of Michigan Application April 30, 1945, Serial No. 591,112

8 Claims. (Cl. 43—147)

This invention relates to an apparatus or implement for distributing material in dust form, such as powdered insecticide, over surfaces or within areas where treatment with such type of material is necessary or desirable.

In small hand operated apparatus for this purpose it is customary to have a chamber in which the dusting material in powdered form is carried, and by blowing air through this chamber the powdered material is picked up by and carried along with the air and thereby discharged in the areas where its presence is required. In these small devices the air is delivered into and through the insecticide chamber by means of a hand operated reciprocatory pump. Since the air delivery from such a pump is intermittent, the air flow through the chamber is not continuous and the feed of the material is consequently not constant. Even though the material is delivered intermittently, it is desirable that the successive discharge of material be substantially uniform in density, or otherwise too much material may be deposited during one pump impulse and too little during another.

The purpose of our present invention is to provide a duster which will be capable of delivering powdered material in a stream of substantially uniform density at each actuation of the pump. This result is attained by delivering the air from the pump into and out from the dust chamber in such a manner that the dust is thereby thoroughly agitated and dispersed throughout the chamber and is in consequence delivered from the chamber and discharged in a stream of uniform density.

More specifically, the agitation of the powdered material and its dispersement throughout the air flowing through the chamber is effected by delivering the air into the dust chamber in a series of spirally directed streams disposed in proximity to the perimeter of the chamber and at one end thereof so as to stir up, thoroughly agitate and impel, under air pressure and centrifugal force, the powdered material contained in the chamber. Air in entering the chamber is so directed as to give it a whirling motion in its passage longitudinally of the chamber and toward the discharge end of the latter, the air entering the chamber and the air and dust moving through the chamber being given transverse as well as longitudinal direction components of motion. At the outlet or discharge end of the chamber there is an inwardly or rearwardly projecting dome or cup-shaped member which is provided with exit slots in its side walls, the slots being bordered by outstanding vanes or louvers disposed, somewhat like air scoops, in the path of the movement of the whirling air and dust. Internally of the cup-shaped member there are other vanes or louvers which guide or deflect the air and dust to maintain its whirling movement in the same sense in which it was whirling before entry into the cup-shaped member. Both the external and the internal vanes or louvers serve to direct the air and air and dust flow and to maintain the suspension of the dust in the air as the air and dust pass into a discharge conduit by which the air and dust mixture are conducted to the point of delivery at the nozzle. The air entering the dust chamber from the pump chamber and the air and dust in and leaving the dust chamber will be so directed by the louvers or baffles that they will have both transverse and longitudinal components of directional movement, relative to the axis of the dust chamber, in their flow into, through and out of the dust chamber. This air or air and dust movement may be referred to herein as a cyclonic or whirling motion and effect.

Another purpose of our invention is to provide a nozzle at the end of the discharge conduit which will be capable of adjustment, so that the direction of delivery of the dust laden air may be adjusted and varied at will without changing the position of the dusting implement as a whole. In other words, the user may carry the implement in a substantially horizontal position and direct the discharge either upwardly or downwardly or at a desired inclination by merely adjusting the position of the nozzle with respect to the discharge conduit.

Other purposes and advantages of our invention should be readily appreciated as the same become better understood by reference to the following description when considered in connection with the accompanying drawing.

Referring to the drawing,

Fig. 1 is an elevation of a duster embodying our invention;

Fig. 2 is an enlarged longitudinal sectional view taken on the line 2—2 of Fig. 4;

Figs. 3 and 4 are transverse sectional views on the lines 3—3 and 4—4, respectively, of Fig. 2;

Fig. 5 is a fragmentary enlarged sectional view on the line 5—5 of Fig. 4; and

Fig. 6 is a transverse sectional view on the line 6—6 of Fig. 2.

Referring to the drawing more in detail, it will be observed that the duster comprises a cylindrical body designated generally by reference character 7 which is divided by a transverse partition 8 into a duster chamber or insecticide reservoir 9 and a pump chamber 11.

The pump chamber houses a piston 12 equipped with a leather cup of usual construction, so that upon outward movement of the piston toward the outer end of the chamber, air which has entered the chamber through an aperture 13 in the end cap 14 may pass the piston, whereas, upon inward movement of the piston the air will be trapped ahead of the piston and forced into the dust chamber 9. The piston is carried by a rod 16 provided at its outer end with a handle 17 and intermediate its ends with shoulders 18 adapted to engage a washer 19 to thereby limit the inward movement of the piston and prevent damage to the leather cup which might be occasioned if permitted to contact the partition 8. A bearing block 21 attached by screws 22 to the inner face of the cap 14 provides an elongated bearing in which the piston rod 16 is guided during its reciprocatory movements. The cap 14 is threaded onto the open end of the cylindrical body so that it may be disconnected therefrom to permit removal of the piston for repair or replacement purposes.

An internal bead 24 struck inwardly from the metal of the body provides a shoulder against which the partition 8 is located and to which it may be fixedly soldered.

In order to agitate the powdered insecticide contained in the chamber 9 and to disperse the same throughout the chamber, so as to thoroughly load the air with the dust, we have equipped the partition 8 with a plurality of, in the present instance three, nozzles 29, each formed by slitting the metal of the partition and bending one edge upwardly to form a louver or baffle 32, as shown in Fig. 5. These nozzles are located near the perimeter of the partition and their axes are disposed radially of the chamber. The location, arrangement and shape of the nozzles cause the air delivered by the pump piston to be discharged into the dust chamber in jets or streams which are directed spirally toward the adjacent outside walls of the chamber, so as to pick up and impart a spiral whirling motion to the insecticide in the chamber. This spiral whirling motion of the air is most effective in producing a uniform and heavy laden mixture of air and powder within the chamber. The spiral whirling movement of the air and material within the chamber is continued toward the outlet end of the chamber, where provision is made for delivering the dust and air mixture into the discharge conduit without causing to any appreciable degree any depositing of the dust or separation of the dust from the air.

The delivery or outer end of the dust chamber is closed by a screw cap 33 beneath which is positioned a gasket 34 to form a hermetic seal. Centrally of the cap there is formed an outwardly projecting extension 35 carrying a projecting tube 36 together forming an outlet conduit, the latter being adapted telescopically to receive and support a discharge extension tube or conduit 37. The outer end of this conduit is telescopically associated with a tubular element 38 projecting from the head section 39 of the discharge nozzle.

The nozzle comprises the head sections 39 and 41, circular in cross section and rotatably connected by an overlapping joint 42, and a flattened tapering nozzle tip 43 carried by the head portion 41 and adapted to deliver the air and entrained dust in a substantially flat spreading stream.

The connecting joint 42 between the head sections of the nozzle provides for adjustment of the nozzle tip 43 into any desired position, two of which are exemplified in full and in dotted lines in Fig. 1. The adjustability of the tip enables the stream of insecticide to be discharged at any desired angle to the axis of the body and at either side thereof. For instance, it may be delivered at any desired angle upwardly or downwardly.

In order to facilitate the delivery of the mixture of air and insecticide powder from the dust chamber to the discharge tube 37 without clogging or permitting the dust to settle or become separated from the air and deposited, the invention contemplates the provision of a novel outlet arrangement. Viewing Fig. 2 it will be observed that the cap 33 is provided with a cup or dome-shaped member 44, the mouth of which covers the inlet end of the discharge conduit and the convex bottom of which projects into the dust chamber. While this cup-shaped member is circular in cross-section it has its side walls disposed at a slightly diverging angle from its bottom to its mouth so that it may be said that this member is somewhat in the shape of a frustum of a cone. The side walls of the member 44 are slitted or slotted at spaced intervals, and of the opposite marginal edges of such slits or slots one is bent inwardly and the other outwardly thereby to provide discharge openings flanked by louvers or baffles 45 and 46, respectively.

Slot openings, designated 47, are so arranged and the louvers or baffles 46 are so disposed with relation to the louvers 32 and to the path of flow of the air and dust in its cyclonic motion within the dust chamber, as to scoop or direct the air and dust into and through the slots or slits 47 with a minimum of resistance or retarding effect on the air and dust. In other words, the louvers or baffles 46 tend to maintain the cyclonic swirl of the air in the same direction or directions as that in which the air and dust were set in motion by the louvers or baffles 32. The air and dust are directed into the interior of the member 44 and through the cooperative action of the internal louvers or baffles 45 are caused to whirl or swirl within that member with the same general directions or directional components of motion as they had within the dust chamber 9. This action maintains the dust in suspension in the air and prevents it from settling so that the dust and air are maintained thoroughly intermixed and a substantially uniform and homogeneous mixture is directed out of the conduit and nozzle. The arrows shown in Figs. 3 and 4 indicate the direction of air and dust flow. The openings 47 have a nozzle effect which assists in maintaining the dust in suspension. The number of discharge openings 47 may be the same as the number of openings 29 or they may be of greater or lesser number, although it is preferred to employ a greater number of openings 47 than there are openings 29, the illustrated embodiment showing four openings 47 and but three openings 29.

It should be apparent from the foregoing that we have provided a duster which will very effectively agitate the insecticide powder in the dust chamber and cause it to be thoroughly mixed with and entrained in the air passing through the chamber, and that the mixture is delivered from the chamber into the discharge conduit without producing the deposit from the mixture of any appreciable amount of insecticide. The delivery of a uniformly rich mixture is thereby attained and the mixture may be delivered in any desired direction by mere adjustment of the rotatably mounted nozzle tip.

The manner in which the air passing through the dust chamber of our novel duster is handled makes possible the delivery of a uniformly dense stream of insecticide, regardless of the position in which the duster is held. This is a feature of marked superiority over the dusters commonly employed, which are practically operative only when held with the outlet tube extending either upwardly or downwardly.

The structural details of our duster may be obviously varied within considerable limits without departing from the scope of our invention as defined in the following claims.

We claim:

1. An insecticide duster, comprising means providing a generally cylindrical dust chamber having a transversely extending end wall provided with a plurality of louvered air inlet openings, the louver surfaces being arranged to deflect the air delivered through said openings into the chamber in paths having transverse and longitudinal direction components of motion with respect to the longitudinal axis of the dust chamber, means for forcing air through said louvered openings, a discharge conduit having its inlet end connected with the opposite end of the said dust chamber, and a cup-shaped member within said dust chamber and covering said inlet of the discharge conduit, said member having a plurality of louvered openings in its side walls, the surfaces of the louvers of said member being arranged to deflect air and dust passing through the openings in said member in paths having transverse and longitudinal direction components of motion in the same sense as the motion of air entering said dust chamber through the first said openings.

2. An insecticide duster, comprising means providing a generally cylindrical dust chamber having a transversely extending end wall provided with a louvered air inlet opening, the louver surface being disposed to deflect the air delivered through said opening into the chamber in a path having transverse and longitudinal direction components of motion with respect to the axis of the dust chamber, means for forcing air through said louvered opening, means providing a discharge conduit at the end of said dust chamber opposite to said end wall, said conduit having its inlet end connected with the said dust chamber, and a cup-shaped member within said dust chamber and covering said inlet of the discharge conduit, said member having a louvered opening in its side wall, the surface of the louver of said member being disposed to deflect air and dust passing through the opening in said member in a path having transverse and longitudinal direction components of motion in the same sense as the motion of air entering said dust chamber through the first said opening.

3. An insecticide duster, comprising means providing a cylindrical dust chamber having one end provided with a transverse wall having a plurality of air inlet openings and a louver in conjunction with at least one opening, said louver being disposed to deflect air delivered into the chamber in paths having a transverse direction component relative to the longitudinal axis of the chamber, the other end of the chamber having a dust and air outlet, a cup-shaped member disposed over said outlet and projecting into said chamber substantially coaxially therewith, said member having a plurality of openings through the side walls thereof about the axis of the chamber, means attached to said member at said openings therethrough for deflecting air and dust passing through said member openings in paths having a transverse component of motion relative to the axis of said member in the same general direction as the air motion within the chamber, and means for supplying air under pressure through said inlet openings into said chamber.

4. An insecticide duster, comprising means providing a cylindrical dust chamber having one end provided with a transverse wall having a plurality of air inlet openings and a louver in conjunction with at least one opening, said louver being disposed to deflect air delivered into the chamber in paths having a transverse direction component relative to the longitudinal axis of the chamber, the other end of the chamber having a dust and air outlet, a cup-shaped member disposed over said outlet and projecting into said chamber substantially coaxially therewith, said member having a plurality of openings through the side walls thereof about the axis of the chamber, means attached to said member at said openings therethrough and projecting into said chamber and the interior of said member for deflecting air and dust passing through said member openings in paths having a transverse component of motion relative to the longitudinal axis of said member, and means for supplying air under pressure through said inlet openings into said chamber.

5. An insecticide duster, comprising means providing a dust chamber having relatively oppositely disposed inlet and outlet ends, said chamber having an inlet end closure provided with a plurality of air inlet openings disposed in spaced relation about the center of said inlet end, each opening having a deflecting louver arranged to deflect air delivered therethrough into said chamber into paths having cyclonic motion, an air pump for delivering air through said openings into the chamber, a discharge conduit inlet leading from the outlet end of the chamber, a cup-shaped member disposed over said conduit inlet and extending into the chamber and communicating with the discharge conduit, said member being provided with a plurality of openings communicating between said chamber and conduit inlet, and louvers arranged in conjunction with said member openings to continue into the conduit the cyclonic movement of air and dust in substantially the same direction as previously induced.

6. An insecticide duster, comprising means providing a dust chamber having relatively oppositely disposed inlet and outlet ends, said chamber having an inlet end closure provided with a plurality of air inlet openings disposed in spaced relation about the center of said inlet end, each opening having a deflecting louver arranged to deflect air delivered therethrough into said chamber into paths having cyclonic motion, an air pump for delivering air through said openings into the chamber, a discharge conduit inlet leading from the outlet end of the chamber, a cup-shaped member disposed over said conduit inlet and extending into the chamber with the interior space of the member in open communication with the discharge conduit, said member being provided with a plurality of openings communicating between said chamber and conduit inlet, and louvers arranged in conjunction with said member openings for creating a cyclonic movement of air and dust in their passage from the chamber into the conduit, some of said louvers projecting into said dust chamber and some projecting into the interior space of said cup-shaped member, the louvers projecting into said dust chamber being inclined to project into the path of flow of air in said dust chamber in the manner of an air scoop.

7. An insecticide duster, comprising a cylindrical body having a transverse partition member intermediate its ends to divide the body into a dust chamber and a pump chamber, said partition member having an opening therethrough for admitting air from the pump chamber into the dust chamber, means for deflecting air entering the dust chamber into a cyclonic movement within the dust chamber, a discharge conduit having an inlet leading from the dust chamber at its end remote from said partition member, a partition member of dome-shape covering said conduit inlet, said dome-shape partition member having its convex side toward said dust chamber and having an opening therethrough for the passage of air and dust from said dust chamber to said conduit, and baffle means adjacent to the last said opening and projecting within and without the dome for deflecting air and dust flowing through the last said opening into a cyclonic movement within the dome as the air and dust move through the last said opening into said conduit.

8. In a duster of the character described, means providing a pump chamber and a dust chamber, a partition disposed between said chambers and having a plurality of openings for effecting communication between the chambers, a discharge conduit having one end leading from said dust chamber, a cup-shaped member disposed over said conduit end and between said dust chamber and conduit, said cup-shaped member having a mouth and said mouth being directed toward said conduit, the side wall of said member having a plurality of openings therethrough, and means for deflecting air passing through all of said openings into paths in the same general direction within both the dust chamber and the member, said paths having transverse and axial direction components.

LYNN FLETCHER.
JOHN WINKS.

REFERENCES CITED

The following references are of record in the file of this patent:

UNITED STATES PATENTS

| Number | Name | Date |
|---|---|---|
| 156,696 | Fichtenberg | Nov. 10, 1874 |
| 555,256 | Monroe | Feb. 25, 1896 |
| 1,276,653 | Herbert et al. | Aug. 20, 1918 |
| 1,406,903 | Rose | Feb. 14, 1922 |
| 1,462,773 | Spencer | July 24, 1923 |
| 1,641,735 | Cheeseman | Sept. 6, 1927 |
| 1,877,778 | Tappan | Sept. 20, 1932 |
| 2,091,055 | Roselund et al. | Aug. 24, 1937 |
| 2,117,362 | Rose | May 17, 1938 |
| 2,288,101 | Mayer | June 30, 1942 |

FOREIGN PATENTS

| Number | Country | Date |
|---|---|---|
| 510,145 | Germany | Oct. 16, 1930 |